(12) United States Patent
Kanebako et al.

(10) Patent No.: US 6,611,073 B2
(45) Date of Patent: Aug. 26, 2003

(54) MAGNETICALLY LEVITATED MOTOR (75) Inventors: Hideki Kanebako, Nagano (JP); Yohji Okada, Ibaraki (JP); Keisuke Abe, Chiba (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 115 days.

(21) Appl. No.: 10/060,089

(22) Filed: Jan. 29, 2002

(65) Prior Publication Data

US 2002/0153790 A1 Oct. 24, 2002

(30) Foreign Application Priority Data

Feb. 15, 2001 (JP) ........................................ 2001-038920

(51) Int. Cl.⁷ ............................................... H02K 17/16
(52) U.S. Cl. ...................... 310/90.5; 310/179; 310/180; 310/206; 310/204
(58) Field of Search ................................ 310/90.5, 179, 310/180, 208, 206, 261, 268, 156.32–156.37, 260

(56) References Cited

U.S. PATENT DOCUMENTS 4,307,311 A * 12/1981 Grozinger ................... 310/179
5,625,240 A * 4/1997 Bernus ....................... 310/90.5
5,744,896 A * 4/1998 Kessinger et al. ........... 310/268
5,962,940 A * 10/1999 Imlach ....................... 310/90.5
6,078,119 A * 6/2000 Satoh et al. ................ 310/90.5
6,313,555 B1 * 11/2001 Blumenstock et al. ..... 310/90.5

* cited by examiner

Primary Examiner—Nestor Ramirez
Assistant Examiner—Leda T. Pham
(74) Attorney, Agent, or Firm—Hogan & Hartson. LLP

(57) ABSTRACT

A rotor includes four magnetic poles provided in a rotational direction at intervals of 90 degrees. A stator includes a winding group for rotation and a winding group for levitation. Each of the winding groups has concentrated windings spaced at intervals of 30 degrees in a rotational direction to provide induction conductive winding sections at twelve locations. Each two of the induction conductive winding sections spaced at an interval of 90 degrees among the twelve induction conductive winding sections are connected to form one winding set such that six winding sets are formed in total in each of the winding groups. Current for rotation and current for levitation are conducted through the six winding sets in the windings for rotation and levitation to perform rotation and levitation controls of the rotor.

21 Claims, 7 Drawing Sheets

MAGNETICALLY LEVITATED MOTOR

BACKGROUND OF THE INVENTION

1. Field of the Invention

The present invention relates to a magnetically levitated motor that magnetically, rotationally supports a rotor in a non-contact manner.

2. Description of Related Art

Conventionally, magnetic bearings that support a rotary body in a non-contact matter are used in various fields. In recent years in particular, radial magnetically levitated motors that integrate a function as a magnetic bearing and a function as a motor have been proposed. A magnetically levitated motor has an advantage in that torque generation for a rotor and positional control of a rotor shaft can be simultaneously performed.

For example, a conventional magnetically levitated motor is equipped with a stator having magnetic poles formed on its inner circumferential surface in which each of the poles is wound with a single-pole winding, a rotor having M number of magnetic poles that are composed of permanent magnets and confronted with the inner circumferential surface of the stator with a gap provided between them, and a control device that conducts current in the windings of the stator for generating a rotary magnetic field with M±2 number of poles along the inner circumferential surface of the stator and for rotating the rotor. Levitation force is obtained by mutual magnetic actions between the rotary magnetic field of the M±2 number of poles generated along the internal surface and the permanent magnets of the rotor. Current to rotate the rotor that is conducted through the windings of the stator is superposed over the current to obtain the levitation force, such that the rotor is magnetically levitated and rotationally driven.

However, the conventional magnetically levitated motor described above requires a complex magnetic flux distribution for the stator, which results in a complex structure, and complex levitation force control is required. Accordingly, it is difficult for the motor to increase the motor speed, and there is a problem in that the levitation force is weak and therefore its efficiency is unsatisfactory.

SUMMARY OF THE INVENTION

In view of the above, it is an object of the present invention to provide a magnetically levitated motor having a stator with a simplified structure, which only requires a simplified control that avoids one of the magnetic levitation force control and the rotational torque control from affecting the other. It is also an object of the present invention to provide an efficient magnetically levitated motor that optimally accommodates very high-speed rotations.

In accordance with one embodiment of the present invention, a magnetically levitated motor may comprise a stator having windings for rotation and windings for levitation, and a rotor having a rotor magnet magnetized in multiple poles, the stator and the rotor being disposed opposite to each other, wherein a rotary shaft of the rotor is levitated in a direction orthogonal to an axis of the rotor and rotationally driven by magnetic force, wherein the rotor magnet includes four magnetic poles provided adjacent to one another in a rotational direction at intervals of 90 degrees, and each of the windings for rotation and the windings for levitation has concentrated windings spaced at intervals of 30 degrees in a rotational direction to provide induction conductive winding sections at twelve locations. In one aspect of the present invention, each two of the induction conductive winding sections spaced at an interval of 90 degrees among the induction conductive winding sections at twelve locations are connected to form one winding set such that six winding sets are formed in total in each of the windings for rotation and the windings for levitation, and current for rotation and current for levitation are conducted through the respective six winding sets to perform rotation and levitation of the rotor. As a result, substantially perfect levitation and rotation can be achieved.

Moreover, separations between the induction conductive winding sections in the winding sets, which respectively correspond to going paths and returning paths in windings, are set at intervals of 90 degrees, which correspond to the separations of the rotor magnets. Therefore, its driving frequency is reduced by half, compared to, for example, a magnetically levitated motor with a rotor magnet having eight magnetic poles and a winding having six poles. As a result, in accordance with the present embodiment, a driving amplifier with a greater speed is not necessary, and heat generation and lowered efficiency that may be caused by an increase in iron loss can be effectively prevented.

In accordance with another embodiment of the present invention, stators and rotor may be formed in a planar confronting configuration, and two planar rotor magnets may be arranged in a direction of a rotor axis of the rotor. The stators may be disposed on both sides of the two planar rotor magnets to be interposed by the stators, and a winding for rotation and a winding for levitation may be mounted on each of the stators. As a result, greater levitation force and rotational torque are obtained, and controls of space four axes except the positional control in the rotational axis direction can be performed.

Furthermore, in accordance with still another embodiment of the present invention, a magnetically levitated motor may be formed in a cylindrical-confronting configuration, and a pair of stator-rotor sets in the cylindrical-confronting configuration may be arranged in a direction of the rotational axis. The motor having this configuration is also capable of producing greater levitation force and rotational torque, and performing controls of space four axes except the position control in the rotational axis direction.

Other objects, features and advantages of the invention will become apparent from the following detailed description taken in conjunction with the accompanying drawings.

EMBODIMENTS OF THE PRESENT INVENTION

A magnetically levitated motor in accordance with one embodiment of the present invention is described below with reference to the accompanying drawings. First, principles for generating rotational torque and levitation force (bearing force) with windings and rotor magnets are described prior to a concrete description of the structure of the magnetically levitated motor.

Figure 3:
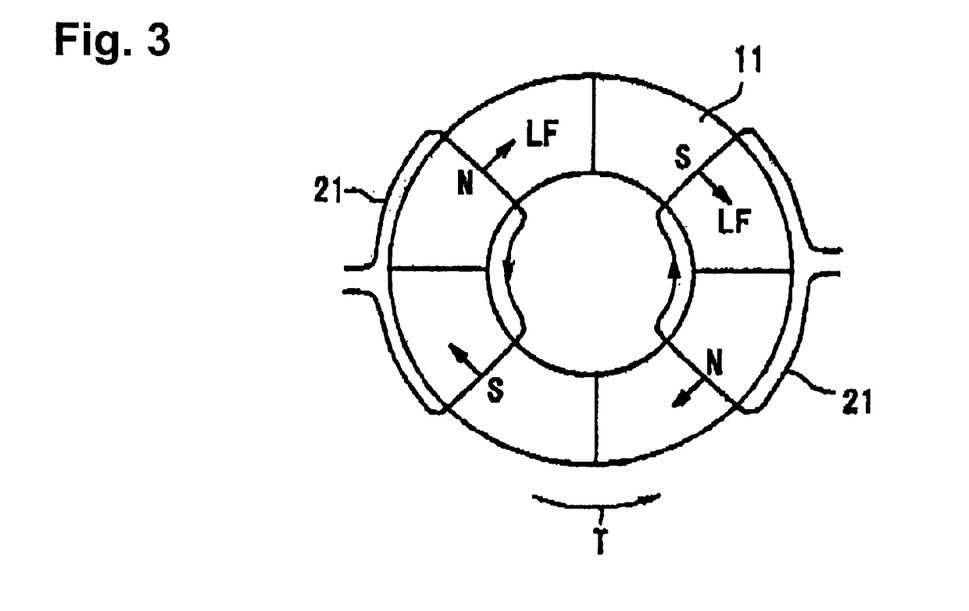
FIG. 3 shows a plan view diagram for explaining a principle for generating a rotational torque in the motor of the embodiment above.
Figure 4:
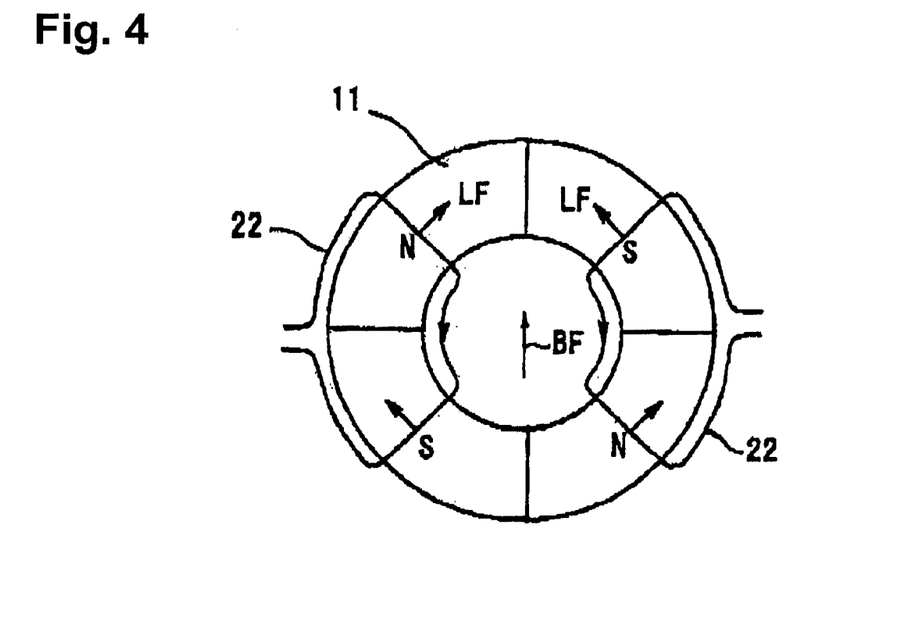
FIG. 4 shows a plan view for explaining a principle for generating a rotational torque in the motor of the embodiment above.

First, to generate a rotational torque, currents that are in phase are conducted in diagonally located two windings in a winding group for rotation 21, as shown in FIG. 3. Lorentz forces LF that are opposite to each other are generated in the windings based on the currents. As a result, a rotational torque T is generated. In the mean time, to generate a levitation force (bearing force), currents having opposite phases are conducted in diagonally located windings in a winding group for bearing 22, as shown in FIG. 4, to thereby generate Lorentz forces LF in the same direction by the currents to generate a force in a radial direction, in other words, a levitation force (i.e., a bearing force) BF.

More concretely, as shown in FIGS. 1 through 4, a rotor 10 and a stator 20 are disposed with their faces being opposite to one another along an axial direction, in which the rotor 10 is freely rotatably supported by an appropriate thrust bearing device (not shown), to thereby form a so-called planar confronting type motor.

The stator 20 is equipped with a winding group for rotation 21 to generate a rotational torque T with respect to the rotor 10 (see FIG. 1(a)), and a winding group for bearing 22 to generate a bearing force BF in a direction orthogonal to the rotary shaft of the rotor 10 (see FIG. 1(b)). Each of the winding group for rotation 21 and the winding group for bearing 22 is formed from six winding sets 21a–21f and 22a–22f, respectively. Each of the winding sets extends in a generally fan shape when viewed in plan. The winding sets are formed generally in the same shape and the same size with respect to one another. The winding group for rotation 21 and the winding group for bearing 22 are layered one on top of the other in the axial direction (up-down direction) and disposed immediately above the stator 20.

Figure 1:
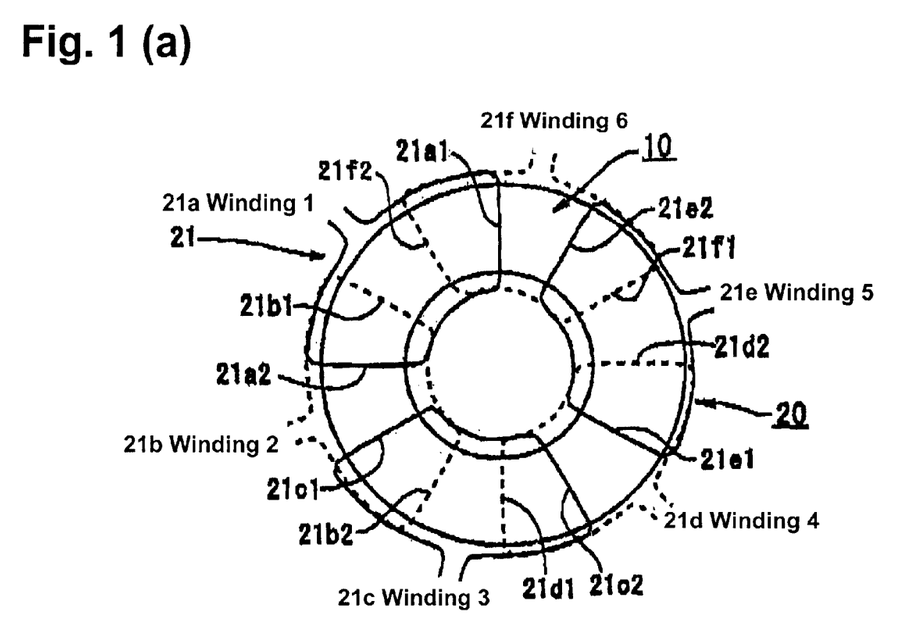
FIGS. 1(a) and 1(b) show a stator section of a magnetically levitated motor in accordance with one embodiment of the present invention, wherein FIG. 1(a) schematically shows a plan view of a winding group for rotation, and FIG. 1(b) schematically shows a plan view of a winding group for levitation.

Each of the winding group for rotation 21 and the winding group for bearing 22 includes concentrated windings to form induction conductive winding sections $21a_1$, $21a_2$, $21b_1$, $21b_2$, ..., $21f_1$, $21f_2$ and $22a_1$, $22a_2$, $22b_1$, $22b_2$, ..., $22f_1$, $22f_2$ at twelve locations arranged at intervals of 30 degrees in a rotational direction, respectively. In FIG. 1, in order to clearly show how the windings overlap one another, ones of the overlapped windings are shown in a solid line, and the others are shown in a broken line, for the sake of convenience. Specified effective ones of the induction conductive winding sections $21a_1$, $21a_2$, $21b_1$, $21b_2$, ..., $21f_1$, $21f_2$ in the winding group 21 are connected to one another to form six winding sets, and specified effective ones of the induction conductive winding sections $22a_1$, $22a_2$, $22b_1$, $22b_2$, ..., $22f_1$, $22f_2$ in the winding group 22 are connected to one another to form six winding sets. As shown in FIGS. 1(a) and 1(b), each one pair of the effective induction conductive winding sections $21a_1$ and $21a_2$, $21b_1$ and $21b_2$, ..., $21f_1$ and $21f_2$, and $22a_1$ and $22a_2$, $22b_1$ and $22b_2$, ..., $22f_1$ and $22f_2$, which are spaced from one another by 90 degrees, are connected as one set. Accordingly, each of the winding group for rotation 21 and the winding group for bearing 22 is formed from six winding sets, as described above.

Figure 5:
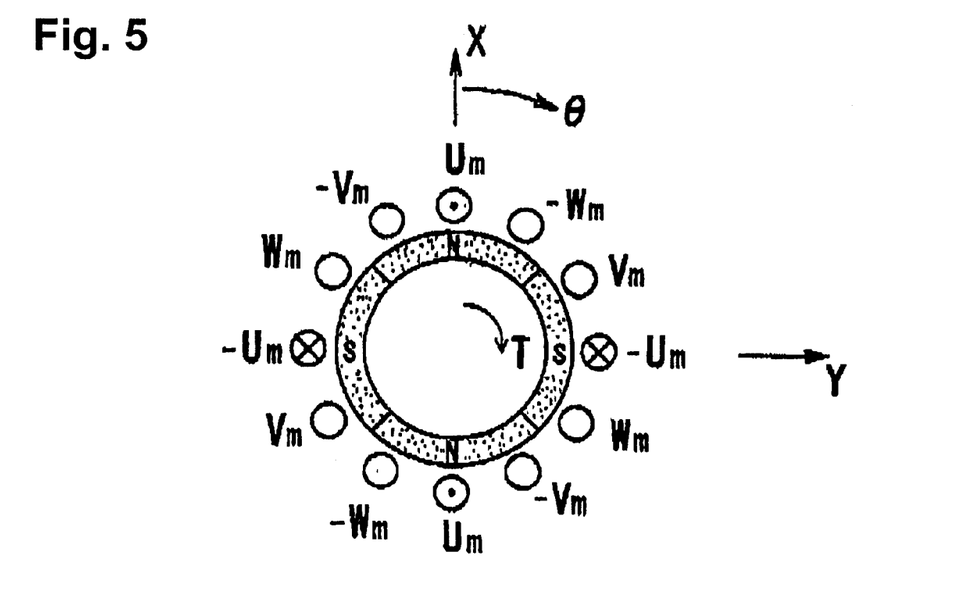
FIG. 5 schematically shows a plan view of one example of currents set for the winding group for rotation.
Figure 6:
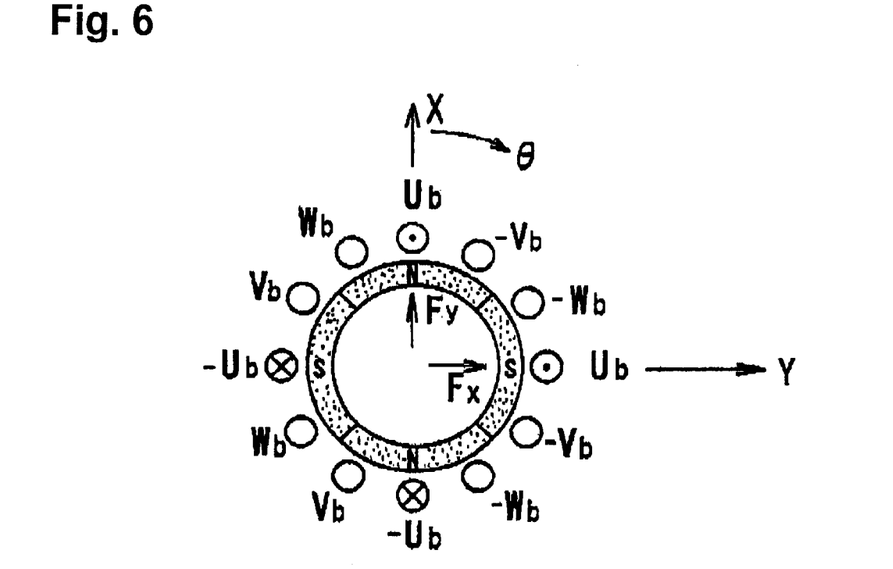
FIG. 6 schematically shows a plan view of one example of currents set for the winding group for levitation.

Currents for rotation for the winding sets 21a–21f, and currents for levitation for the winding sets 22a–22f are conducted, for example, in manners shown in FIG. 5 and FIG. 6, respectively, such that those opposing in a radial direction among the winding sets 21a–21f, and 22a–22f have the same phase. In other words, each four among the twelve induction conductive winding sections $21a_1$, $21a_2$, $21b_1$, $21b_2$, ..., $21f_1$, $21f_2$ and $22a_1$, $22a_2$, $22b_1$, $22b_2$, ..., $22f_1$, $22f_2$ which are spaced at intervals of 90 degrees, are formed to conduct one phase, such that a total of three phases, i.e., U-, W- and V-phases are conducted.

Figure 2:
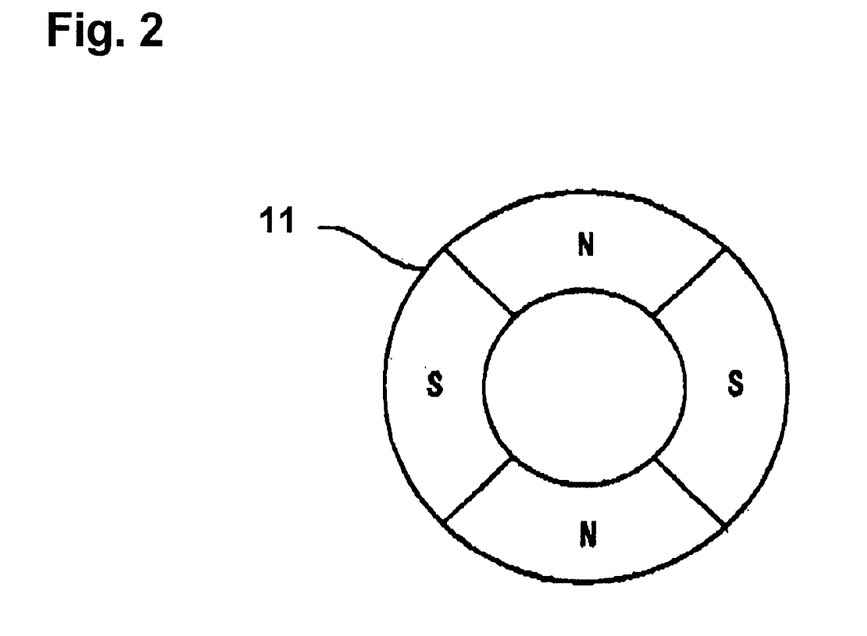
FIG. 2 schematically shows a plan view of a rotor magnet of the magnetically levitated motor in accordance with one embodiment of the present invention.

In the mean time, the rotor 10 has a rotor magnet 11 shown in FIG. 2 affixed to one surface side of a disk-shaped back yolk (not shown). The rotor magnet 11 is magnetized to have four magnetic poles at intervals of 90 degrees in the rotational direction.

The winding group for rotation 21 and the winding group for bearing 22 that conduct currents having the U-, W- and V-phases in the stator 20 and the four-pole rotor magnet 11 in the rotor 10 develop a magnetic flux Bg that sinusoidally varies. The magnetic flux Bg, which is given by Expression 1 below, is generated in an air gap between the rotor 10 and the stator 20.

$$Bg = B\cos(\omega t + 2\theta) \qquad \text{[Expression 1]}$$

In the mean time, the currents for rotation with the three phases that are set in a manner shown in FIG. 5 may be given by Expression 2 as follows:
[Expression 2]

$$I_{Um} = A\cos(\omega t + \varphi)$$

$$I_{Vm} = A\cos\left(\omega t + \frac{2}{3}\pi + \varphi\right)$$

$$I_{Wm} = A\cos\left(\omega t + \frac{4}{3}\pi + \varphi\right)$$

Definitions for the variables are as follows:
B: Amplitude of magnetic flux density of magnet
ω: Angular frequency
t: Time
θ: Rotation coordinates fixed on the stator
A: Amplitude of current φ: Phase difference between magnetic flux generated by winding and rotor
r: Radius of rotor A half cycle of a motor current that flows along the circumference may be given by Expression 3 as follows by using the Dirac delta function:
[Expression 3]

$$i_m = I_{Um}\{\delta(\theta) - \delta(\theta - \pi/2) + \delta(\theta - \pi) - \delta(\theta - 3\pi/2)\} +$$
$$I_{Wm}\{-\delta(\theta - \pi/6) + \delta(\theta - 2\pi/3) - \delta(\theta - 7\pi/6) + \delta(\theta - 5\pi/3)\} +$$
$$I_{Vm}\{\delta(\theta - \pi/3) - \delta(\theta - 5\pi/6) + \delta(\theta - 4\pi/3) - \delta(\theta - 11\pi/6)\}$$

With such a current, a rotational torque T that works on a rotor having an effective length in the axial direction of $l_m$ is given by Expression 4 shown below based on Lorentz force (according to Fleming's left-hand rule). The torque is calculated on the assumption that the same current will flow in the remaining half cycle, and it is two times as large as that for the half cycle.
[Expression 4]

$$T = 2rl_m \int_0^\pi Bgi_m d\theta = 6rl_m AB \cos\phi$$

Accordingly, by the motor in accordance with the present embodiment, a constant torque can be generated by the motor current A and the phase φ without regard to a position of the rotor and time.

Furthermore, in a manner similar to a synchronous motor, the following motor controls can be conducted with the phase φ of the three-phase current:

φ=0°: Servomotor control by the amplitude A
φ=90°: Synchronous motor having no load
0°<φ<90°: Synchronous motor having load Next, a levitation force control in accordance with the embodiment of the present invention is described.

The magnetic flux Bg in a sine wave represented by Expression 1 above is generated in a gap between the rotor 10 and the stator 20. The currents for levitation with the three phases that are set in a manner shown in FIG. 6 may be set as follows:
[Expression 5]

$$I_{Ub} = C\cos(\omega t + \phi)$$
$$I_{Vb} = C\cos\left(\omega t + \frac{2}{3}\pi + \phi\right)$$
$$I_{Wb} = C\cos\left(\omega t + \frac{4}{3}\pi + \phi\right)$$

When the currents indicated in Expression 5 are set, a distribution of current for generating levitation force in a radial direction that flows along the circumference can be given by Expression 6 as follows:
[Expression 6]

$$i_b = I_{Ub}\{\delta(\theta) + \delta(\theta - \pi/2) - \delta(\theta - \pi) - \delta(\theta - 3\pi/2)\} +$$
$$I_{Vb}\{-\delta(\theta - \pi/6) + \delta(\theta - 2\pi/3) + \delta(\theta - 7\pi/6) - \delta(\theta - 5\pi/3)\} +$$
$$I_{Wb}\{-\delta(\theta - \pi/3) - \delta(\theta - 5\pi/6) + \delta(\theta - 4\pi/3) + \delta(\theta - 11\pi/6)\}$$

Definitions for the variables above are as follows:
B: Amplitude of magnetic flux density of magnet
ω: Angular frequency
t: Time
θ: Rotation coordinates fixed on the stator
C: Amplitude of radial direction control current for rotor
φ: Phase difference between currents in windings for levitation When a vertical upward direction with respect to the base of the motor is y, and a horizontal lateral direction is x, a force Fy acting in the vertical upward direction, which is caused by the currents for generating levitation force, is given by Expression 7 as follows:
[Expression 7]

$$Fy = l_m \int_0^{2\pi} Bgi_b \cos\theta d\theta = \frac{3\sqrt{2}}{2} l_m BC\cos\left(\phi - \frac{\pi}{4}\right)$$

Also, a force Fx acting in the lateral direction is given by Expression 8 as follows:
[Expression 8]

$$Fx = l_m \int_0^{2\pi} Bgi_b \sin\theta d\theta = \frac{3\sqrt{2}}{2} l_m BC\sin\left(\phi - \frac{\pi}{4}\right)$$

As seen from the foregoing description, it is understood that the levitation force control can be conducted without regard to the rotation control of the rotor, and does not interfere with the torque control. Also, it is understood from the above that the control force can be generated in every direction on the circumference by the phase difference φ.

The levitation and rotation control described above can be achieved by structures other than the one described above. For example, the levitation and rotation control described above can be achieved by a structure with the number of magnetic poles of a rotor magnet being eight, and the number of poles of the windings being six. However, in the structure of the embodiment described above, separations between the induction conductive winding sections $21a_1$ and $21a_2, \ldots, 21f_1$ and $21f_2$ and $22a_1$, and $22a_2, \ldots, 22f_1$ and $22f_2$ which respectively correspond to a going path and a returning path of each winding set among the winding groups 21 and 22, are 90 degrees, which are the same as the separations of the rotor magnets 11. Therefore, its driving frequency is reduced by half, compared to the one with the rotor magnet having eight magnetic poles and the windings having six poles. As a result, a driving amplifier with a greater speed is not necessary, and heat generation and lowered efficiency that may be caused by an increase in iron loss can be effectively prevented.

In the embodiment described above, the winding group for rotation 21 and the winding group for bearing 22 are separately provided. However, since the winding group for rotation 21 and the winding group for bearing 22 are equal in configuration and size, and disposed at the same location while being superposed with one another, a common winding that shares a winding for rotation and a winding for bearing may be provided, and current for generating a bearing force and current for generating a rotational torque may be superposed with one another and conducted through the common winding. The common winding may include a group of common windings. This structure also provides a rotational torque and a levitation force, and can control the rotational torque and the levitation force. As a result, the structure can be simplified by providing the common winding.

Figure 7:
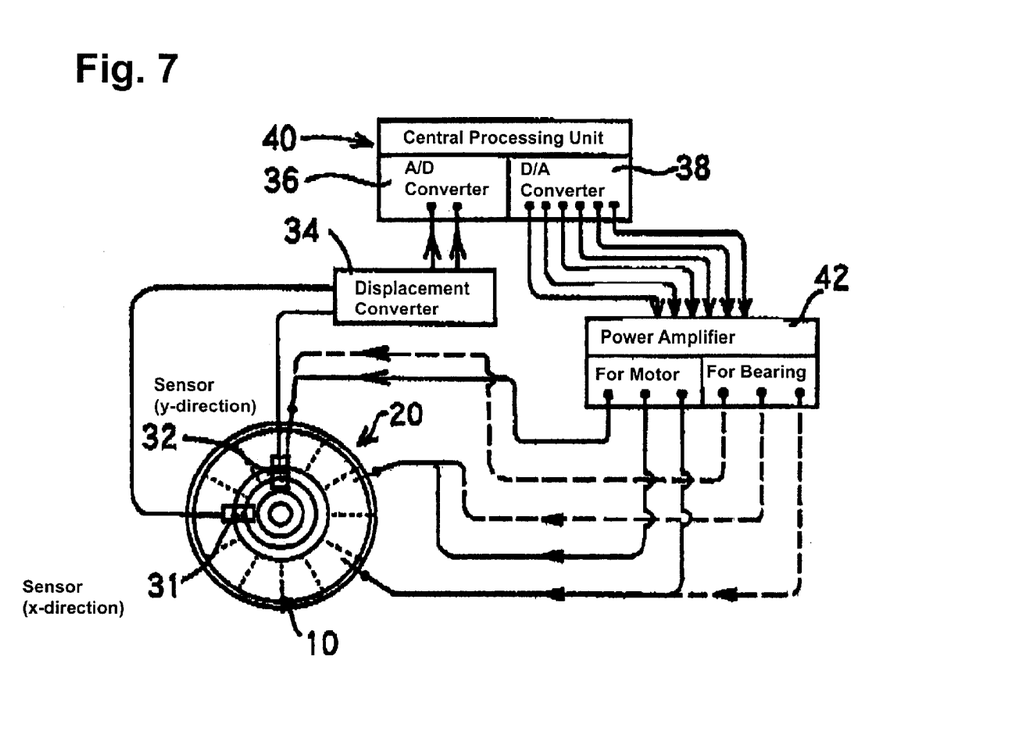
FIG. 7 shows a block diagram of one example of a control system applicable to the motor of the embodiments of the present invention.

The rotation control and the levitation force control for the magnetically levitated motor described above may be conducted by a control system shown as an example in FIG.

1. In FIG. 7, two displacement sensors 31 and 32 are provided to detect displacements of a plane of the rotor 10 that is orthogonal to a rotary shaft of the rotor 10. The displacement sensor 31 detects displacements in the X direction, and the displacement sensor 32 detects displacements in the Y direction that is orthogonal to the X direction. Detection outputs from each of the displacement sensors 31 and 32 are sent through an appropriate converter 34 and then inputted in an analog-to-digital converter 36 to convert them into digital signals, which are then inputted in a central processing unit (hereafter referred to as "CPU") 40. The CPU outputs control signals through a digital-to-analog converter 38 to control current conduction to the winding group for rotation and the winding group for bearing.

The control signals are inputted in a power amplifier 42, and the power amplifier 42 provides currents to the winding group for rotation and the winding group for bearing corresponding to the control signals. By controlling the current conduction to the winding for bearing with the control system described above, the rotary shaft of the rotor can be maintained at a predetermined position.

Figure 8:
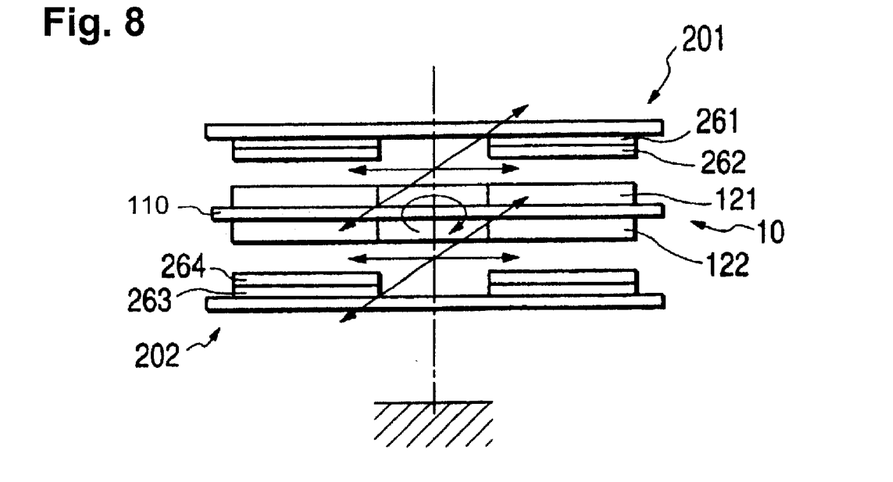
FIG. 8 conceptually shows a front view of a magnetically levitated motor in accordance with another embodiment of the present invention.

Each of the embodiments described above has a structure in which one stator and one rotor are disposed opposite to one another. In one embodiment, as shown in FIG. 8, the stator and the rotor may be structured in a planar confronting type, wherein planar rotor magnets 121 and 122 may be provided on both sides of a back yolk 110 of the rotor 10 in a rotational axial direction, stators 201 and 202 may be provided on both sides of the two planar rotor magnets 121 and 122 to be interposed by the stators 201 and 202, and windings for bearing 261 and 263 and windings for rotation 262 and 264 may be provided on each of the corresponding respective stators 201 and 202. By this, the rotational torque can be increased by the push-pull system, and four degrees of freedom in the radial direction can be actively controlled.

Figure 9:
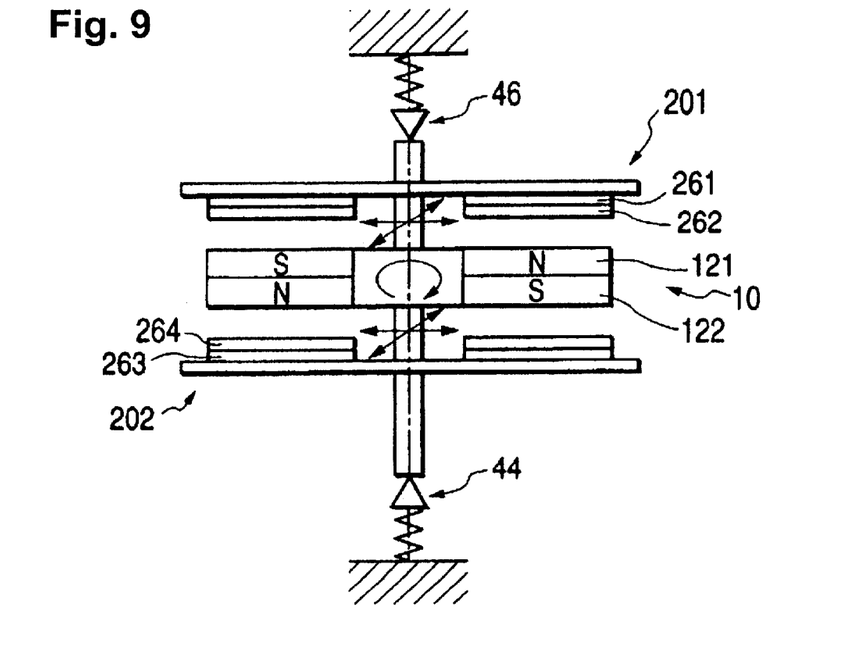
FIG. 9 conceptually shows a front view of a magnetically levitated motor in accordance with still another embodiment of the present invention.

FIG. 9 shows another example, in which magnets 121 and 122 that compose a rotor are disposed in a manner that their magnetic polarities are reverse to one another, and the back yolk 110 of the rotor 10 in the embodiment shown in FIG. 8 is omitted, such that the two plane type rotor magnets 121 and 122 are directly superposed one another. This structure also provides the same actions and functions of the embodiment shown in FIG. 8, and does not require a back yolk, which provides an advantage to reduce the weight of the rotor.

In the embodiments described so far and shown in FIGS. 8 and 9, the conduction of currents to the winding for bearing and the winding for rotation is controlled to perform a variety of controls. For example, at least control of displacements of the rotor in the X direction, control of displacements of the rotor in the Y direction, four-axis control for controlling inclinations of each of an X plane and a Y plane of the rotor, and control of the rotational torque can be conducted.

A thrust load of the rotor may be supported by an appropriate thrust bearing. For example, in the example shown in FIG. 9, shafts are provided to extend from upper and lower central areas of the rotor 10, and the shafts may be rotatably supported by pivots 44 and 46, respectively. Alternatively, the rotor 10 may be freely, rotatably supported by a thrust magnetic bearing in a non-contact manner.

Figure 10:
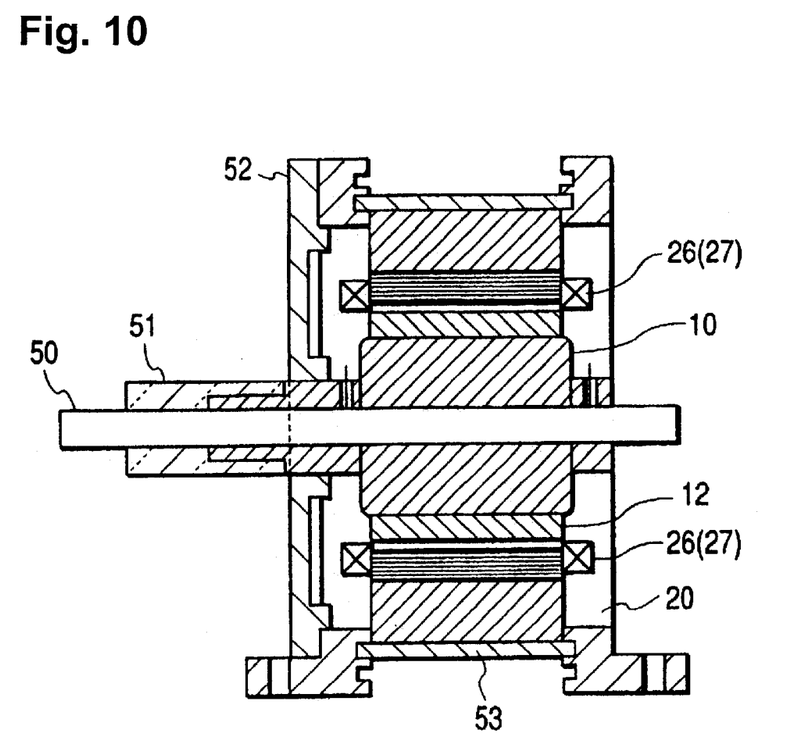
FIG. 10 shows a longitudinal cross-sectional view of a magnetically levitated motor in accordance with still another embodiment of the present invention.
Figure 11:
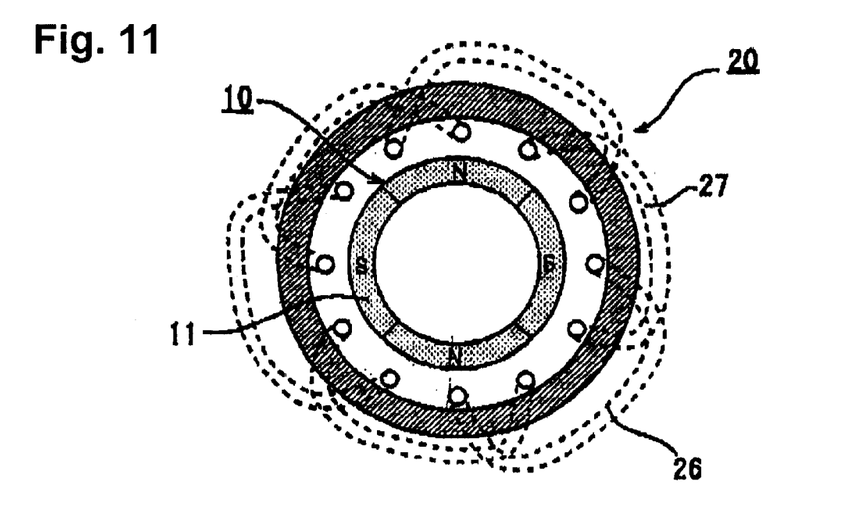
FIG. 11 shows a transverse cross-sectional view of the motor shown in FIG. 10.

FIGS. 10 and 11 show embodiments in which the principle of generating rotational torque and the principle of generating and controlling levitation force described above are applied to a cylindrical-confronting type motor wherein magnetic poles of a ring-shaped rotor magnet 12 and stator coils 21 and 22 arranged opposite to the magnetic poles in a radial direction are disposed in a relation equal to that of the planar confronting type of the embodiment described above. This structure allows independent control of the rotational torque and the levitation force just as does the planar confronting type.

For example, referring to FIGS. 10 and 11, the cylindrical-confronting type motor includes a supporting plate 52, an auxiliary cylinder 53 that is supported by the supporting plate 52, and a stator 20 that is affixed to an inner circumference of the auxiliary cylinder 53. A rotary shaft 50 of the rotor 10 extends through a central aperture of the supporting plate 52. A detection member 51 is affixed to the rotary shaft 50 to detect a rotation center position of the rotor 10. The rotor 10 and the rotary shaft 50 and the detection member 51 can rotate in a non-contact state with respect to other members.

Figure 12:
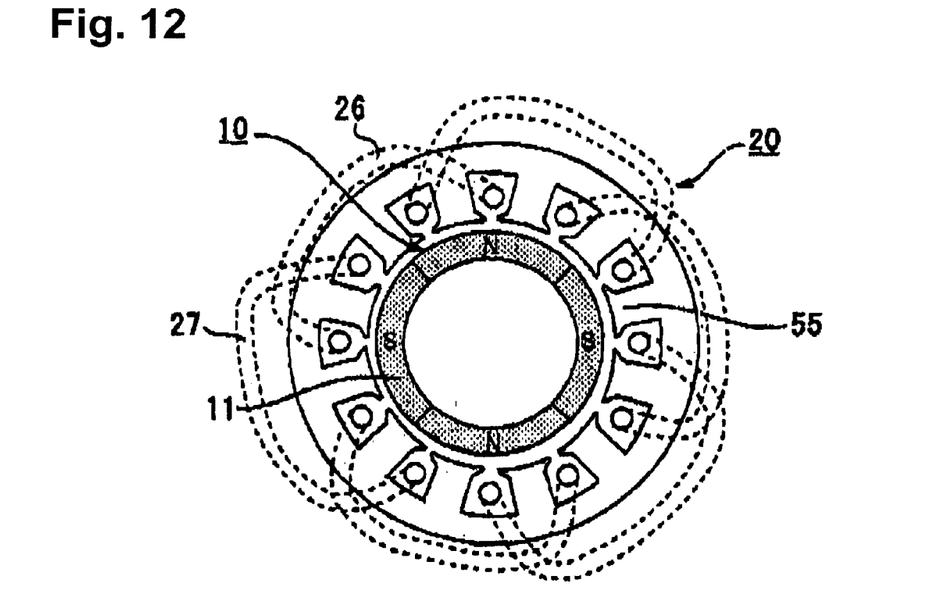
FIG. 12 shows a transverse cross-sectional view of a magnetically levitated motor in accordance with still another embodiment of the present invention.

FIG. 12 shows another embodiment in which salient poles 55 are additionally provided in the stator 20 of the above-described embodiment shown in FIGS. 10 and 11 in order to more effectively utilize the magnetic flux generated by the stator coils 26 and 27. The stator coils (i.e., windings) 26 and 27 are wound on the salient poles 55 whereby the gap between the rotor and the stator can be made smaller while maintaining an appropriate magnetic relation between the rotor and the stator. Accordingly, greater rotational force and levitation force can be obtained.

Figure 13:
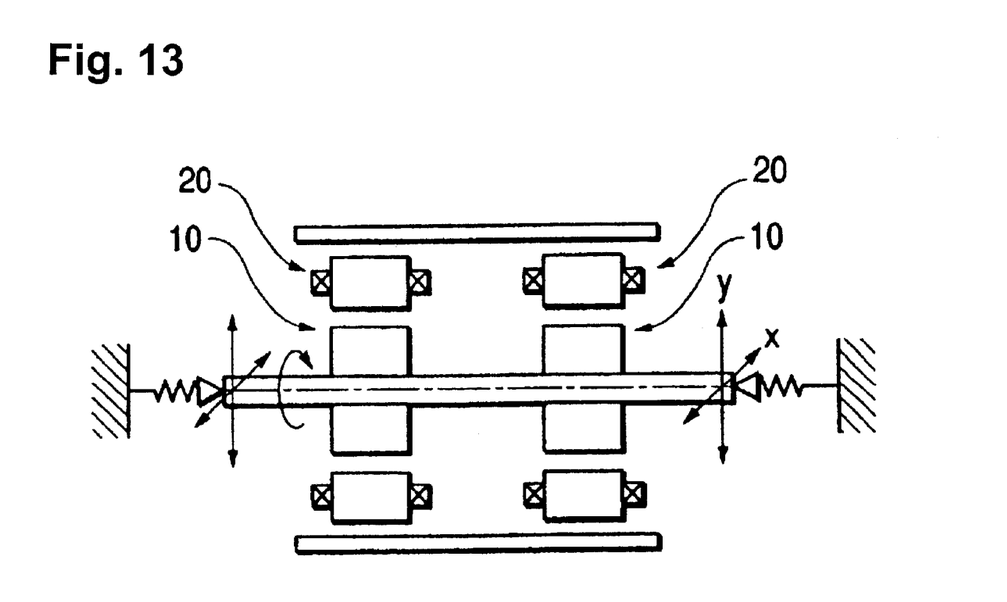
FIG. 13 conceptually shows a front view of a magnetically levitated motor in accordance with still another embodiment of the present invention.

FIG. 13 conceptually shows an embodiment in which the cylindrical-confronting type embodiment shown in FIGS. 10 through 12 is further modified, wherein two cylindrical-confronting type magnetically levitated motors, each being similar the type described above, are arranged in the axial direction. In this embodiment, displacement control in X direction orthogonal to the rotational axis of the rotor 10, displacement control in Y direction orthogonal to the rotational axis of the rotor 10 and orthogonal to X direction, four-axis control for controlling inclinations in each of the X plane and Y plane of the rotor, and rotational torque control can be performed. A thrust load of the rotor 10 may be supported by an appropriate thrust bearing. For example, the rotor 10 can be freely, rotatably supported by pivots. Alternatively, the rotor 10 may be freely, rotatably supported by a thrust magnetic bearing in a non-contact manner.

As described above, in the magnetically levitated motor in accordance with the present invention, the rotor magnet includes four magnetic poles provided in a rotational direction at intervals of 90 degrees, each of the winding for rotation and the winding for levitation has concentrated windings spaced at intervals of 30 degrees in a rotational direction to provide induction conductive winding sections at twelve locations, each two of the induction conductive winding sections spaced at an interval of 90 degrees among the induction conductive winding sections at twelve locations are connected to form one set such that six winding sets are formed, and current for rotation and current for levitation are conducted through the six winding sets to perform rotation and levitation of the rotor, whereby perfect levitation and rotation can be achieved. Accordingly, the structure of the stator is simplified; one of the magnetic levitation control and the rotational torque control does not affect to the other control; and the axial length can be shortened such that the critical speed can be increased accordingly.

In particular, the present invention provides excellent effects, in that the driving frequency can be reduced such that an effort to increase the speed of driving amplifiers becomes unnecessary, and heat generation and lowered efficiency that may be caused by an increase in iron loss can be effectively prevented.

Also, in accordance with the present invention, stators and rotor may be formed in a planar confronting configuration, and two planar rotor magnets may be arranged in a direction of a rotor axis of the rotor. The stators may be disposed on both sides of the two planar rotor magnets to be interposed by the stators, and a winding for rotation and a winding for levitation are mounted on each of the stators. As a result, greater levitation force and rotational torque are obtained, and controls of spatial four axes except positional control in a direction of the rotational axis can be performed.

Furthermore, in accordance with the present invention, a magnetically levitated motor may be formed in a cylindrical-confronting configuration, and at least a pair of stator-rotor sets in the cylindrical-confronting configuration may be arranged in a direction of the rotational axis. By this configuration, greater levitation force and rotational torque are also obtained, and controls of space four axes except the positional control in a direction of the rotational axis can be performed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A magnetically levitated motor comprising:
   at least one stator having a winding group for rotation and a winding group for levitation, each of the winding group for rotation and the winding group for levitation having concentrated windings spaced at intervals of 30 degrees in a rotational direction to provide induction conductive winding sections at twelve locations; and
   at least one rotor having a rotor magnet magnetized to have four magnetic poles arranged adjacent to one another in a rotational direction at intervals of 90 degrees, the stator and the rotor being confronted to each other while the rotor is levitated in a direction orthogonal to an axis of the rotor and rotationally driven by magnetic force,
   wherein each two of the induction conductive winding sections spaced at an interval of 90 degrees among the twelve induction conductive winding sections are functionally connected to form a winding set such that six winding sets are formed in total in each of the winding group for rotation and the winding group for levitation.

2. A magnetically levitated motor according to claim 1, wherein each four of the induction conductive winding sections spaced at intervals of 90 degrees among the induction conductive winding sections at twelve locations conduct current of one phase, such that currents in three phases are conducted in total.

3. A magnetically levitated motor according to claim 1, wherein the stator and the rotor are arranged to constitute a planar confronting configuration.

4. A magnetically levitated motor according to claim 1, wherein the stator and the rotor are arranged to constitute a cylindrical-confronting configuration.

5. A magnetically levitated motor according to claim 1, wherein the winding group for rotation and the winding group for levitation are formed in an identical configuration, disposed at the same locations and superposed with one another.

6. A magnetically levitated motor according to claim 1, wherein the winding group for rotation and the winding group for levitation are superposed with one another such that the twelve induction conductive winding sections in the winding group for rotation are disposed at the same locations where the twelve induction conductive winding sections in the winding group for levitation are disposed.

7. A magnetically levitated motor according to claim 1, wherein the six winding sets in each of the winding group for rotation and the winding group for levitation have a generally identical fan-like shape occupying a region of 90 degrees of a circle of the stator.

8. A magnetically levitated motor according to claim 7, wherein the six winding sets in the winding group for rotation and the six winding sets in the winding group for levitation are circularly arranged on the stator at the same locations.

9. A magnetically levitated motor according to claim 1, wherein the winding group for rotation and the winding group for levitation are separated and independent from one another.

10. A magnetically levitated motor according to claim 1, wherein the winding group for rotation and the winding group for levitation are formed by a common winding group.

11. A magnetically levitated motor according to claim 10, wherein current for rotation and current for levitation are superposed and conducted through the common winding group.

12. A magnetically levitated motor according to claim 1, further comprising a displacement sensor that detects displacements of a plane of the rotor, the plane being orthogonal to a rotational axis of a rotor shaft of the rotor.

13. A magnetically levitated motor according to claim 1, wherein the stator and the rotor formed in a planar confronting configuration are equipped with two planar rotor magnets arranged in a direction of a rotor axis of the rotor,
   the stators are disposed on both sides of the two planar rotor magnets to be interposed by the stators, and
   a winding group for rotation and a winding group for levitation are mounted on each of the stators.

14. A magnetically levitated motor according to claim 1, wherein the stator and the rotor are formed so as to constitute a cylindrical-confronting configuration motor.

15. A magnetically levitated motor according to claim 10, wherein at least a pair of the cylindrical-confronting configuration motors are arranged along a common rotational axis of the rotor.

16. A magnetically levitated motor according to claim 10, wherein at least a pair of stator-rotor sets in the cylindrical-confronting configuration are disposed along a common rotational axis of the rotor.

17. A magnetically levitated motor comprising:
   at least one stator having a winding group for rotation and a winding group for levitation, each of the winding group for rotation and the winding group for levitation has six winding sets circularly arranged on the disk at generally equal intervals, each of the six winding sets arranged on the stator in a generally identical fan-like shape occupying a region of 90 degrees of a circle of the stator; and
   at least one rotor having a rotor magnet magnetized to have four magnetic poles arranged adjacent to one another in a rotational direction at intervals of 90 degrees, the stator and the rotor being confronted to each other while the rotor is levitated in a direction orthogonal to an axis of the rotor and rotationally driven by magnetic force.

18. A magnetically levitated motor according to claim 17, wherein each of the six winding sets in each of the winding group for rotation and the winding group for levitation includes two concentrated windings, such that each of the winding group for rotation and the winding group for levitation has the concentrated windings at twelve locations spaced at equal intervals arranged in a rotational direction.

19. A magnetically levitated motor according to claim 17, wherein the concentrated windings at twelve locations are spaced at intervals of 30 degrees.

20. A magnetically levitated motor according to claim 19, wherein the winding group for rotation and the winding group for levitation are formed in an identical configuration, disposed at the same locations and superposed with one another.

21. A magnetically levitated motor according to claim 19, wherein the winding group for rotation and the winding group for levitation are superposed with one another such that the twelve induction conductive winding sections in the winding group for rotation are disposed at the same locations where the twelve induction conductive winding sections in the winding group for levitation are disposed.

* * * * *